United States Patent Office 3,510,258
Patented May 5, 1970

3,510,258
PROCESS FOR THE MANUFACTURE OF FAUJA-
SITE-TYPE CRYSTALLINE ALUMINOSILICATES
Saul G. Hindin, Mendham, N.J., and Joseph C. Dettling,
Forest Hills, N.Y., assignors to Engelhard Industries,
Inc.
No Drawing. Filed July 19, 1966, Ser. No. 566,235
Int. Cl. C01b 33/28
U.S. Cl. 23—113                              21 Claims

ABSTRACT OF THE DISCLOSURE

There is disclosed a method for the manufacture of faujasite-type crystalline aluminosilicates having a silica-to-alumina mole ratio of at least about 2:1. The process involves aging an aqueous mixture of hydrous silica, sodium aluminate and sodium hydroxide. The mixture has designated mole ratios of $SiO_2/Al_2O_3$, $Na_2O/SiO_2$ and $H_2O/Na_2O$. Aging is at a temperature of about 25 to 50° C. for about 5 to 50 hours to form an intermediate product. The intermediate product is combined with a major amount of a separately prepared gel made from an aqueous mixture of sodium silicate and sodium aluminate. The latter mixture has defined mole ratios of $SiO_2/Al_2O_3$, $Na_2O/SiO_2$ and $H_2O/Na_2O$. The combined mixture is aged at a temperature of about 80 to 110° C. to form a crystalline product composed to a major extent of the faujasite-type crystalline aluminosilicate.

---

This invention relates to a method for the manufacture of crystalline aluminosilicates. More particularly, the invention concerns a method for producing crystalline aluminosilicates which are useful as adsorbents, catalysts, catalyst carriers, for example, in hydrocracking or other hydrocarbon conversion reactions, and as other solid, treating or contacting agents. These crystalline aluminosilicates are synthetic faujasites and have a silica-to-alumina mole ratio of at least about 2:1 and relatively large pores in the 9 to 15 angstrom unit range.

Various processes for the preparation of crystalline aluminosilicates have heretofore been proposed. One of the most described methods for producing crystalline aluminosilicates involves a two-stage aging process wherein a gel prepared from a silica sol, sodium aluminate, and sodium hydroxide undergoes a low temperature aging step for about 24 hours followed by a second aging or crystallization step for a similar amount of time at a higher temperature. However, this process suffers from many deficiencies such as, for example, the use of high cost silica sol, silica gel, for amorphous solid silica as the major source of silica. Also, these methods are handicapped by the necessity of subjecting the entire reaction mass to two stage aging with the attendant problems of handling large amounts of material and high capital cost.

According to the process of the present invention an improved two-stage aging method for producing crystalline aluminosilicates having a silica-to-alumina mole ratio of at least about 2:1, has been developed wherein only a minor amount of the total silica-containing material utilized need undergo both stages of aging. Thus, a mixture made from hydrous silica such as a silica sol or a silica gel, sodium aluminate and sodium hydroxide is aged. The aged material is combined with a gel made from sodium silicate and sodium aluminate, and, if desired, sodium hydroxide. The resulting mixture undergoes further aging at a higher temperature than used in the first aging step, and the aluminosilicates of this invention are crystallized during the second aging stage. Thus aside from only a single aging step for a majority of the silica-containing material, our method permits the use of the relatively inexpensive sodium silicate as the principal silica source, say up to about 98% of the total silica in the crystalline aluminosilicate. Preferably for pure products about 90% to 95% of the total silica derives from the sodium silicate. Thus, by using an inexpensive source of silica as the major silica-containing constituent and by avoiding the low temperature aging step for the majority of the silica-containing reaction mass, a faujasite-type crystalline aluminosilicate has been produced while avoiding the high cost of conventional processes.

In our method the material supplying the minor source of silica can be prepared by relatively low temperature aging of an aqueous mixture formed by combining hydrous silica, sodium aluminate and sodium hydroxide. This aging is conducted at a temperature of about 25 to 50° C., preferably about 25 to 40° C. for about 5 to 50 hours, preferably about 15 to 30 hours. As stated, the amount of silica in the mixture is a minor amount of the total silica source, $SiO_2$ basis, used in the overall process. Thus, the total silica source includes the $SiO_2$ present during initial aging plus the $SiO_2$ added as sodium silicate before the second aging at a higher temperature.

The minor amount of silica source used in the initial aging stage can be obtained in various ways. A colloidal silica sol or gel can be purchased or the hydrous silica can be prepared, for example, by acidifying a solution of sodium silicate with a mineral acid, e.g., hydrochloric acid, water washing to remove anions, and then partially drying, e.g., to obtain a product of about 40 to 95% water. A convenient drying temperature is about 105 to 115° C.

The partially-aged intermediate product is combined with a major amount, greater than about 50% up to about 98% based on the total silica source, of a gel prepared from an aqueous mixture of sodium silicate and sodium aluminate, and sodium hydroxide may be added to give a desired $Na_2O/SiO_2$ mole ratio in the mixture. This gel can be combined with the product from the initial aging step, more or less immediately after the gel is made, i.e., there need not be any significant aging of the gel, and on a commercial scale we prefer that the gel be used within about three hours after the gel is formed in order to avoid having to provide undue amounts of storage capacity. The mixture resulting from combination of the sodium silicate-derived gel and the product from initial aging is aged at a temperature of about 80 to 110° C., preferably about 85 to 98° C., for a time sufficient to give a crystalline product composed in major proportion of the relatively large pore crystalline aluminosilicate of the present invention, e.g., the aging time may be about 5 to 50 hours, preferably about 15 to 30 hours. In general, the lower temperatures can be used with the longer holding times. The aging steps of the process of the present invention are conducted under conditions which are sufficiently quiescent to give the desired crystalline aluminosilicate. Excessive agitation can lead to the formation of large amounts of small pore, e.g., 5 A., aluminosilicates which are unsuitable for many uses. Also, aging times which are too short or excessive will not give the large pore, crystalline aluminosilicates of the invention and the use of uncontrolled proportions of reactants will not provide the desired results. Of course, if one wishes a small pore or amorphous product, the reaction conditions can be selected to give such materials. After the second aging step of the process of this invention the crystalline aluminosilicate product can be water washed, for instance to a pH of about 9 to 10, and dried.

The amounts of hydrous silica, sodium aluminate, sodium hydroxide, water and any other materials used to make the mixture which undergoes the lower temperature aging step are such as to provide a mixture containing the following molar ratios:

$SiO_2/Al_2O_3$ about 2 to 40:1, preferably about 2 to 15:1.
$Na_2O/SiO_2$ about .2 to 7:1, preferably about .3 to 2:1.
$H_2O/Na_2O$ about 10 to 90:1, preferably about 35 to 50:1.

Similar ratios of the indicated components may be present when making the gel which is added to the product from the lower temperature aging step, and these ratios are provided by control of the amounts of sodium silicate, sodium aluminate, sodium hydroxide, water and any other ingredients used.

Although we have stated overall ranges for the ratios of reactant components present during the initial aging step of our invention, the nature of the product to be made affects these ratios to a certain extent. Thus the characteristics of the final product, i.e., the silica-to-alumina mole ratio, may correspond in a general way to those of the product from the initial aging even though the latter does not exhibit significant crystallinity, see Example 1 hereinafter. One type of large pore, crystalline aluminosilicate of the invention has a silica-to-alumina mole ratio of about 2 to 3:1, and in obtaining such materials the medium employed in making the mixture subjected to initial aging may contain amounts of the several ingredients to give the following mole ratios:

$SiO_2/Al_2O_3$ about 2.5 to 5:1.
$Na_2O/SiO_2$ about .5 to 2:1.
$H_2O/Na_2O$ about 20 to 60:1.

If desired, the sodium silicate-derived gel may be made from a mixture having these ratios of the components indicated.

A preferred type of large pore, crystalline aluminosilicate has a silica-to-alumina mole ratio greater than 3:1, for instance, about 3.5 to 6:1, preferably from about 4 to 5.5:1. These products, especially when in the hydrogen-exchanged form, exhibit improved structural stability at elevated temperatures as compared with similar products of lower silica-to-alumina mole ratio which have larger cell dimensions. A particularly desired product has a silica-to-alumina mole ratio of about 4.8;1.

It is most unusual indeed to be able to produce, as in the present invention, the large pore, crystalline faujasite-type aluminosilicates having a silica-to-alumina mole ratio of at least about 4:1 while using sodium silicate as the major source of silica.

In the manufacture of the higher silica-to-alumina mole ratio products of the present invention the medium subjected to initial aging may have its ingredients combined in amounts which give a mixture having the following ratios:

$SiO_2/Al_2O_3$ about 8 to 30:1, preferably about 8 to 15:1.
$Na_2O/SiO_2$ about .2 to .6:1, preferably about .3 to .5:1.
$H_2O/Na_2O$ about 25 to 80:1, preferably about 35 to 50:1.

Also, the sodium silicate-derived gel may be made from a mixture having these ratios of the components indicated.

As previously stated, the amounts of the product from the lower temperature aging step and the separately prepared gel combined for aging at a higher temperature are controlled so that the major $SiO_2$ contribution comes from the separately prepared sodium silicate-derived gel with the minor amount emanating from the product of the lower temperature aging operation. In general similar ratios of $SiO_2/Al_2O_3$, $Na_2O/SiO_2$ and $H_2O/Na_2O$ dependent on the product desired may be used for the sodium silicate-derived gel as for the medium subjected to initial aging in each particular case. However, high purity of a desired faujasite product may also be obtained with considerable variation of ingredient ratios in the sodium silicate-derived gel from those used in the medium subjected to initial aging.

If desired, the separate gel derived from the lower temperature aging step, the other gel prepared from sodium silicate, or their mixture may contain minor amounts of other ingredients providing the stated molar ratios are maintained and the production of the desired crystalline aluminosilicate is not unduly adversely affected. The pores of the crystalline aluminosilicates are usually relatively uniform in size and often the crystalline aluminosilicate particles can have a size less than about 5 microns, preferably less than about 3 microns. A convenient manner of designating the cell dimensions of the crystalline aluminosilicates is by lattice constant as determined by X-ray spectra. Thus, a typical large port, crystalline aluminosilicate having a $SiO_2/Al_2O_3$ mole ratio of 2.7:1 has a 24.92 A. lattice constant, while a similar product of 4.8 $SiO_2/Al_2O_3$ mole ratio has a lattice constant of 24.68 A.

The sodium of the crystalline aluminosilicates of the present invention can be replaced by numerous other cations, i.e., the sodium cations can be replaced in part or entirely by ion exchange with other monovalent, bivalent or trivalent cations. Among the forms of the crystalline aluminosilicates which can be prepared are those obtained by ion exchange with materials such as, for example, lithium, potassium, hydrogen, silver, ammonium, magnesium, calcium, zinc, barium, aluminum, manganese, etc. These forms may easily be obtained from the correspondent sodium forms by conventional ion exchange techniques. Thus, the calcium ion, for example, may replace part or all of the sodium ions to produce the calcium form; and the sodium ions can also be exchaged partially or completely with ammonium ions and the aluminosilicate calcined to produce the hydrogen form. Other techniques can be employed to produce the hydrogen form, but the ammonium exchange is the most common.

The hydrogen form or the polyvalent metal forms of the crystalline aluminosilicates of the present invention possess the acid function required to serve as catalysts for various hydrocarbon conversion reactions, e.g., cracking and isomerization. For purposes of hydrocracking or hydroisomerization a minor portion of a suitable metal hydrogenating component, e.g., a Group VIII metal, can be incorporated in the crystalline aluminosilicate. The preferred hydrogenating metals comprise the Group VIII noble metals, particularly platinum, palladium or rhodium. To incorporate these metals by ion exchange, the crystalline aluminosilicates can be digested with an aqueous solution of a suitable compound of the desired metal wherein the metal is present in the cationic form, followed, if desired, by reduction to form the free metal or calcination or a sequential combination of both.

The crystalline aluminosilicates prepared by the present process are useful in many industrial applications. For example, they can be employed as absorbents to separate mixtures of compounds or to purify gas streams, and can also be used as catalysts or bases for catalysts. More specifically, these crystalline aluminosilicates in their hydrogen form or in a polyvalent metal form, such as, for example, a crystalline aluminosilicate partially or completely exchanged with magnesium, are useful in catalysts for isomerization, cracking and particularly for hydrocracking processes, e.g., the hydrocracking of mineral oil fractions boiling primarily in the range of about 300 to 1000° F.

The following examples illustrate the advantages of the process of the present invention, but are not to be considered as limiting.

EXAMPLE 1

To 27.7 g. of $NaAlO_2$ in 106 cc. $H_2O$ was added 27.4 g. NaOH. The resulting solution was added to 237 g. Ludox (30% by weight of $SiO_2$ as an aqueous $SiO_2$ sol) and the mixture was stirred. The mixture was then held quiescent at 35° C. for 24 hours, and water washed to a pH of 10. The solid product was found to be amorphous by X-ray diffraction analysis and thus the process did not give the product of the present invention.

EXAMPLE 2

A sodium aluminate solution (56.8 g. of $NaAlO_2$ added to 168 cc. $H_2O$ and having 46.0% wt. $Al_2O_3$, 31.0% wt. $Na_2O$, and 25.0% wt. $H_2O$) was added to 560 g. of sodium silicate solution (Philadelphia Quartz, "S–35" brand sodium silicate solution, 25.3% wt. $SiO_2$, 6.75% wt. $Na_2O$ and 67.95% $H_2O$). After thorough mixing, the preparation was aged quiescently for 24 hours at 35° C. and then at 95° C. for 24 hours. The solid product was washed with deionized water to a pH of 10 and dried at 110° C. for 24 hours. The solid product was found to be amorphous containing a small amount of a small pore crystalline aluminosilicate as determined by X-ray diffraction analysis and thus the process did not give the product of the present invention.

EXAMPLE 3

29.4 g. of NaOH (98.7% wt. purity) was dissolved in a sodium aluminate solution (27.9 g. $NaAlO_2$ and 106 cc. $H_2O$) and the mixture was cooled to room temperature. The resulting solution was mixed with 237 g. of the Ludox of Example 1, after which the mixture was held in a quiescent state for 24 hours at 35° C. and designated solution A.

A separate gel was made by mixing a sodium aluminate-sodium hydroxide solution (27.9 g. $NaAlO_2$, 124 cc. $H_2O$ and 1.02 g. NaOH) with 247 g. of "N" brand sodium silicate solution, Philadelphia Quartz (28.7% wt. $SiO_2$, 8.9% wt. $Na_2O$ and 62.4% wt. $H_2O$), and the product was designated gel B. 40 g. of solution A was blended with 355 g. of gel B, and the blend was held in a quiescent state at 88° C. for 24 hours. The resulting solids were washed with deionized water to a pH of 10 and then dried at 110° C. for 24 hours. The product was a large pore, crystalline aluminosilicate of the faujasite-type having a $SiO_2/Al_2O_3$ mole ratio of about 4.8:1 and lattice constant of 24.70±0.02. This example illustrates the method of the present invention as successful in preparing a preferred faujasite crystalline aluminosilicate.

The preparation of Example 3 was repeated twice except that in one of the additional runs 40 g. of solution A was mixed with 360 g. of gel B while in the second additional run 20 g. of solution A was blended with 380 g. of gel B. In the additional preparations the products were faujasite crystalline aluminosilicates having an approximate 4.8:1 $SiO_2/Al_2O_3$ ratio and lattice constants of 24.70 and 24.72, respectively.

EXAMPLE 4

26.2 g. of NaOH (98.7% wt. purity) was dissolved in a sodium aluminate solution (28.0 g. $NaAlO_2$ and 106 cc. $H_2O$) and the mixture was cooled to room temperature. The resulting solution was mixed with 71 g. of the Ludox of Example 1, after which the mixture was held in a quiescent state for 24 hours at 35° C. and designated solution A.

A separate gel was made by mixing a sodium aluminate-sodium hydroxide solution (28.0 g. $NaAlO_2$, and 114 cc. $H_2O$) with 70.9 g. of "N" brand sodium silicate solution, Philadelphia Quartz (28.7% wt. $SiO_2$, 8.9% wt. $Na_2O$ and 62.4% wt. $H_2O$) which had been acidified with 2.18 cc. of conc. HCl, and the product was designated gel B. 40 g. of solution A was blended with 360 g. of gel B, and the blend was held in a quiescent state at 92° C. for 24 hours. The resulting solids was washed with deionized water to a pH of 10 and then dried at 110° C. for 24 hours. The product was a large pore, crystalline aluminosilicate of the faujasite-type having a $SiO_2/Al_2O_3$ mole ratio of about 2.3:1 and lattice constant of 24.97±0.02. This example illustrates the method of the present invention as successful in preparing a low $SiO_2$-to-alumina mole ratio faujasite crystalline aluminosilicate.

EXAMPLE 5

4.9 g. of NaOH was dissolved in a sodium aluminate solution (28.7 g. $NaAlO_2$ and 111 cc. $H_2O$) and the mixture was cooled to room temperature. This solution was added to 59.6 g. of the Ludox of Example 1 along with 189 g. of "N" grand sodium silicate (28.7% wt. $SiO_2$, 8.9% wt. $Na_2O$ and 62.4% wt. $H_2O$). After thorough mixing the preparation was aged quiescently for 24 hours at 27° C. and then at 95° C. for 24 hours. The solids were washed with deionized water to a pH of 10 and dried at 110° C. for 24 hours. The solid product was found to be amorphous by X-ray diffraction analysis and thus mixing of the Ludox and the sodium silicate prior to any aging and followed by two stage aging, did not give the product of the present invention.

EXAMPLE 6

1.40 kg. of sodium aluminate (62.17% $Al_2O_3$) was dissolved in 5.29 kg. of water, and 1.31 kg. of NaOH was then added to the solution. The mixture was cooled to room temperature, and 3.55 kg. of the Ludox (30% $SiO_2$) was added with vigorous stirring which was continued for 15 minutes. The resulting mixture was allowed to stand quiescently for a period of 24 hours. At the beginning of the period the temperature of the mixture was 35° C. and during the first two hours it increased to 39° C. This temperature remained for two hours after which a temperature decrease was noted. At the end of the 24-hour period the temperature was 33° C. The aged material is designated solution A.

31.90 kg. of aqueous sodium silicate solution-"N" brand (28.7% $SiO_2$) was peptized by the slow addition of 981.5 cc. of concentrated HCl with vigorous agitation. During the final stages of acid addition, there was a substantial increase in viscosity which made mixing difficult. 12.6 kg. of sodium aluminate (62.17% $Al_2O_3$) was dissolved in 51.31 kg. of water, and the solution was added to the peptized sodium silicate with vigorous agitation. Agitation continued while the mixture was heated to 92° C., at which time solution A was added. After the addition, agitation was continued 3 minutes and the mixture was then held quiescently at 92° C. for 28 hours. Samples were taken at 20, 22, 24, 26 and 28 hours to determine the lattice constants for the faujasite-type, crystalline aluminosilicate produced. X-ray diffraction analysis of the samples gave the following.

| Total aging at 92° C. (hours): | Lattice constant, A. |
| --- | --- |
| 20 | 24.97±0.03 |
| 22 | 24.96±0.03 |
| 24 | 24.96±0.03 |
| 26 | 24.94±0.03 |
| 28 | 24.95±0.03 |

The solids of each sample were separated by filtration and washed with deionized water to a pH of about 10. The washed material was dried at 110° C. for 16 hours, and the product was a large pore, faujasite-type, crystalline aluminosilicate of the present invention, in which the silica-to-alumina molar ratio was about 2.4:1.

EXAMPLE 7

1.82 kg. of sodium aluminate (62.17% $Al_2O_3$) was dissolved in 7.36 kg. of water, and 1.70 kg. of NaOH was then added to the solution. The mixture was cooled to 31° C., and 15.4 kg. of Ludox (30% $SiO_2$) was added with vigorous stirring which was continued for 15 minutes. The resulting mixture was allowed to stand quiescently for a period of 24 hours. During the first 2.25 hours of the period the temperature increased to 34° C., and the mixture remained at this temperature for two hours after which a temperature decrease was noted. At the end of the 24-hour period the temperature was 32° C. The aged material is designated solution A.

144.5 kg. of aqueous sodium silicate solution-"N" brand (28.7% $SiO_2$) was peptized by the slow addition (112.0 cc./min.) of 4,446 cc. of concentrated HCl with vigorous agitation. During the final stages of acid addition, there was a substantial increase in viscosity which made mixing difficult. 16.38 kg. of sodium aluminate (62.17% $Al_2O_3$) was dissolved in 66.24 kg. of water, and the solution was added to the peptized sodium silicate with vigorous agitation. Agitation continued while the mixture was heated to 92° C. in 1.25 hours at which time the aged solution A was added over a period of 3 minutes with minimum agitation. The mixture was then held quiescently at 92° C. for 28 hours. Small samples were taken at 20, 22, 24, 26 and 28 hours to determine the lattice constants for the faujasite-type, crystalline aluminosilicate produced and X-ray diffraction analysis of the samples gave the following.

| Total aging at 92° C. (hours): | Lattice constant, A. |
| --- | --- |
| 20 | 24.71 |
| 22 | 24.71 |
| 24 | 24.71 |
| 26 | 24.70 |
| 28 | 24.71 |

The aqueous material stood for about 24 hours at 30° C. The solids of each sample were then separated by filtration over a two days period and washed with de-ionized water to a pH of about 10. The washed material was dried at 110° C. for 16 hours and the product was composed of at least 95% of a large pore, faujasite-type, crystalline aluminosilicate of the present invention, in which the silica-to-alumina molar ratio was about 4.5±0.3:1. The yield of this crystalline aluminosilicate was about 86% based on the $Al_2O_3$ charged.

It is claimed:

1. A method for the manufacture of faujasite-type crystalline aluminosilicates having a silica-to-alumina mole ratio of at least about 2:1 which consists essentially of aging a first aqueous mixture of hydrous silica, sodium aluminate and sodium hydroxide, said mixture having a $SiO_2/Al_2O_3$ mole ratio of about 2 to 40:1, a $Na_2O/SiO_2$ mole ratio of about 0.2 to 7:1, and a $H_2O/Na_2O$ mole ratio of about 10 to 90:1, at a temperature of about 25 to 50° C. for about 5 to 50 hours to form an intermediate product, combining said intermediate product with a major amount, based on the total silica in the resulting mixture, of a separately prepared gel made from a second aqueous mixture of sodium silicate and sodium aluminate, said second mixture having a $SiO_2/Al_2O_3$ mole ratio of about 2 to 40:1, a $Na_2O/SiO_2$ mole ratio of about 0.2 to 7:1, and a $H_2O/Na_2O$ mole ratio of about 10 to 90:1, and aging the combined mixture at a temperature of about 80 to 110° to form a crystalline product composed to a major extent of said faujasite-type crystalline aluminosilicate.

2. The method of claim 1 in which the time of the second aging step is about 15 to 30 hours.

3. The method of claim 2 in which the time of the first aging step is about 15 to 30 hours.

4. The method of claim 3 in which the separately prepared gel is combined with the intermediate product from the initial aging step within about 3 hours after the gel is formed.

5. The method of claim 1 in which said first aqueous mixture has a $SiO_2/Al_2O_3$ mole ratio of about 2 to 15:1, a $Na_2O/SiO_2$ mole ratio of about 0.3 to 2:1, and a $H_2O/Na_2O$ mole ratio of about 35 to 50:1.

6. The method of claim 5 in which said second aqueous mixture has a $SiO_2/Al_2O_3$ mole ratio of about 2 to 15:1, a $Na_2O/SiO_2$ mole ratio of about 0.3 to 2:1, and a $H_2O/Na_2O$ mole ratio of about 35 to 50:1.

7. The method of claim 1 in which said first aqeuous mixture has a $SiO_2/Al_2O_3$ mole ratio of about 2.5 to 5:1, a $Na_2O/SiO_2$ mole ratio of about 0.5 to 2:1, and a $H_2O/Na_2O$ mole ratio of about 20 to 60:1.

8. The method of claim 1 in which said first aqueous mixture has a $SiO_2/Al_2O_3$ mole ratio of about 8 to 30:1, a $Na_2O/SiO_2$ mole ratio of about 0.2 to 0.6:1, and a $H_2O/Na_2O$ mole ratio of about 25 to 80:1.

9. The method of claim 1 in which said first aqueous mixture was a $SiO_2/Al_2O_3$ mole ratio of about 8 to 15:1, a $Na_2O/SiO_2$ mole ratio of about 0.3 to 0.5:1, and a $H_2O/Na_2O$ mole ratio of about 35 to 50:1.

10. The method of claim 8 in which said second aqueous mixture has a $Si_2O/Al_2O_3$ mole ratio of about 2 to 15:1, a $Na_2O/SiO_2$ mole ratio of about 0.3 to 2:1, and a $H_2O/Na_2O$ mole ratio of about 35 to 50:1.

11. The method of claim 8 in which said second aqueous mixture has a $SiO_2/Al_2O_3$ mole ratio of about 8 to 15:1, a $Na_2O/SiO_2$ mole ratio of about 0.3 to 0.5:1, and a $H_2O/Na_2O$ mole ratio of about 35 to 50:1.

12. The method of claim 8 in which said second aqueous mixture has a $SiO_2/Al_2O_3$ mole ratio of about 8 to 30:1, a $Na_2O/SiO_2$ mole ratio of about 0.2 to 0.6:1, and a $H_2O/Na_2O$ mole ratio of about 25 to 80:1.

13. The method of claim 9 in which said second aqueous mixture has a $SiO_2/Al_2O_3$ mole ratio of about 8 to 15:1, a $Na_2O/SiO_2$ mole ratio of about 0.3 to 0.5:1, and a $H_2O/Na_2O$ mole ratio of about 35 to 50:1.

14. The method of claim 1 in which about 50% to 98% of the total silica derives from the sodium silicate.

15. The method of claim 3 in which about 90% to 95% of the total silica derives from the sodium silicate.

16. The method of claim 7 in which the time of aging in each againg step is about 15 to 30 hours.

17. The method of claim 8 in which the time of aging in each aging step is about 15 to 30 hours.

18. The method of claim 9 in which the time of aging in each aging step is about 15 to 30 hours.

19. The method of claim 10 in which the time of aging in each aging step is about 15 to 30 hours.

20. The method of claim 11 in which the time of aging in each aging step is about 15 to 30 hours.

21. The method of claim 20 in which the separately prepared gel is combined with the intermediate product from the initial aging step within about 3 hours after the gel is formed.

References Cited

UNITED STATES PATENTS

| | | | |
| --- | --- | --- | --- |
| 3,130,007 | 4/1964 | Breck | 23—113 |
| 3,227,660 | 1/1966 | Hansford | 252—455 |
| 3,321,272 | 5/1967 | Kerr | 23—113 |
| 3,343,913 | 9/1967 | Robson | 23—113 |
| 3,374,058 | 3/1968 | McDaniel et al. | 23—113 |
| 3,433,589 | 3/1969 | Ciric et al. | 23—113 |

EDWARD J. MEROS, Primary Examiner

U.S. Cl. X.R.

23—112